US012555943B2

(12) United States Patent
Cheng

(10) Patent No.: US 12,555,943 B2
(45) Date of Patent: Feb. 17, 2026

(54) CHIP CONNECTOR WITH IMPROVED TERMINALS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Shan-Yong Cheng, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 420 days.

(21) Appl. No.: 18/117,584

(22) Filed: Mar. 6, 2023

(65) Prior Publication Data

US 2023/0283003 A1 Sep. 7, 2023

(30) Foreign Application Priority Data

Mar. 7, 2022 (CN) ......................... 202220479373.1

(51) Int. Cl.
*H01R 13/24* (2006.01)
*H01R 12/71* (2011.01)
*H01R 13/41* (2006.01)

(52) U.S. Cl.
CPC ....... *H01R 13/2435* (2013.01); *H01R 12/714* (2013.01); *H01R 13/41* (2013.01)

(58) Field of Classification Search
None
See application file for complete search history.

(56) References Cited

U.S. PATENT DOCUMENTS 6,942,495 B2 * 9/2005 Liao .................. H01R 13/2435 439/71
11,264,765 B2 3/2022 Lotes et al.

FOREIGN PATENT DOCUMENTS

CN 208157699 U 11/2018
CN 111029826 B 11/2021

* cited by examiner

*Primary Examiner* — Ross N Gushi
(74) *Attorney, Agent, or Firm* — Ming Chieh Chang

(57) ABSTRACT

A chip connector includes: an insulative housing defining an upper face and a lower face, plural receiving passageways extending through the upper face and the lower face, a pair of fixing slots at opposite sides of each receiving passageway, and a pair of buckling recesses; and plural conductive terminals received respectively in the receiving passageways, each terminal having a main portion extending longitudinally, an upper elastic arm extending from the main portion with an upper contacting portion, and a lower elastic arm extending from the main portion with a lower contacting portion, and two fixing portions at opposite sides of the main portion, the fixing portion having a buckling head, wherein the buckling head slantwise extends upwards and outwards from an upper edge of the fixing portion and is retained in the buckling recess when the fixing portions are retained in the retaining slots.

13 Claims, 6 Drawing Sheets

CHIP CONNECTOR WITH IMPROVED TERMINALS

BACKGROUND OF THE INVENTION

Field of the Invention

The present invention relates generally to a chip connector, and particularly to a chip connector with improved terminals.

Description of Related Arts

China Patent No. 210111103 discloses a chip connector for connecting a chip module to a circuit board, comprise an insulative housing with terminal passageways, and conductive terminals disposed in the terminal passageways, respectively. Both sides of the terminals are provided with retaining portions protruding outward, and the terminals are fixed by hard interference between the retaining portions of the terminals and the inner wall face of the terminal passageways. However, the terminals often fall off from the terminal passageways when the terminals are stressed or impacted during transportation. With a development of high frequency transmission, the structure of the chip connector is also constantly changing, such as the CPO developed by the OIF Association, multiple chip modules are continuously expanded or stacked, such as the chip connector disclosed by China Publication No. 111029826A, resulting in thinning requirements. It is known that the holding force exerted by the housing on the terminal must meet certain requirements due to the elastic deformation of the terminal in the housing. However, the thinning of the housing brings extreme difficulty to design and manufacture a housing with good holding force for the chip connector.

Therefore, it is necessary to provide a chip connector with improved terminals to overcome the above defects.

SUMMARY OF THE INVENTION

The objective of the present invention is to provide a chip connector with improved retaining terminals.

To achieve the above object, a chip connector comprises: an insulative housing defining an upper face and a lower face, a plurality of receiving passageways extending through the upper face and the lower face, a pair of fixing slots at opposite sides of each receiving passageway, and a pair of buckling recesses; and a plurality of conductive terminals received respectively in the receiving passageways, each terminal comprising a main portion extending longitudinally, an upper elastic arm extending from the main portion with an upper contacting portion located above the upper face, and a lower elastic arm extending from the main portion with a lower contacting portion located below the lower face, and two fixing portions at opposite sides of the main portion, the fixing portion having a buckling head, wherein the buckling head slantwise extends upwards and outwards from an upper edge of the fixing portion and is retained in the buckling recess when the fixing portions are retained in the retaining slots.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
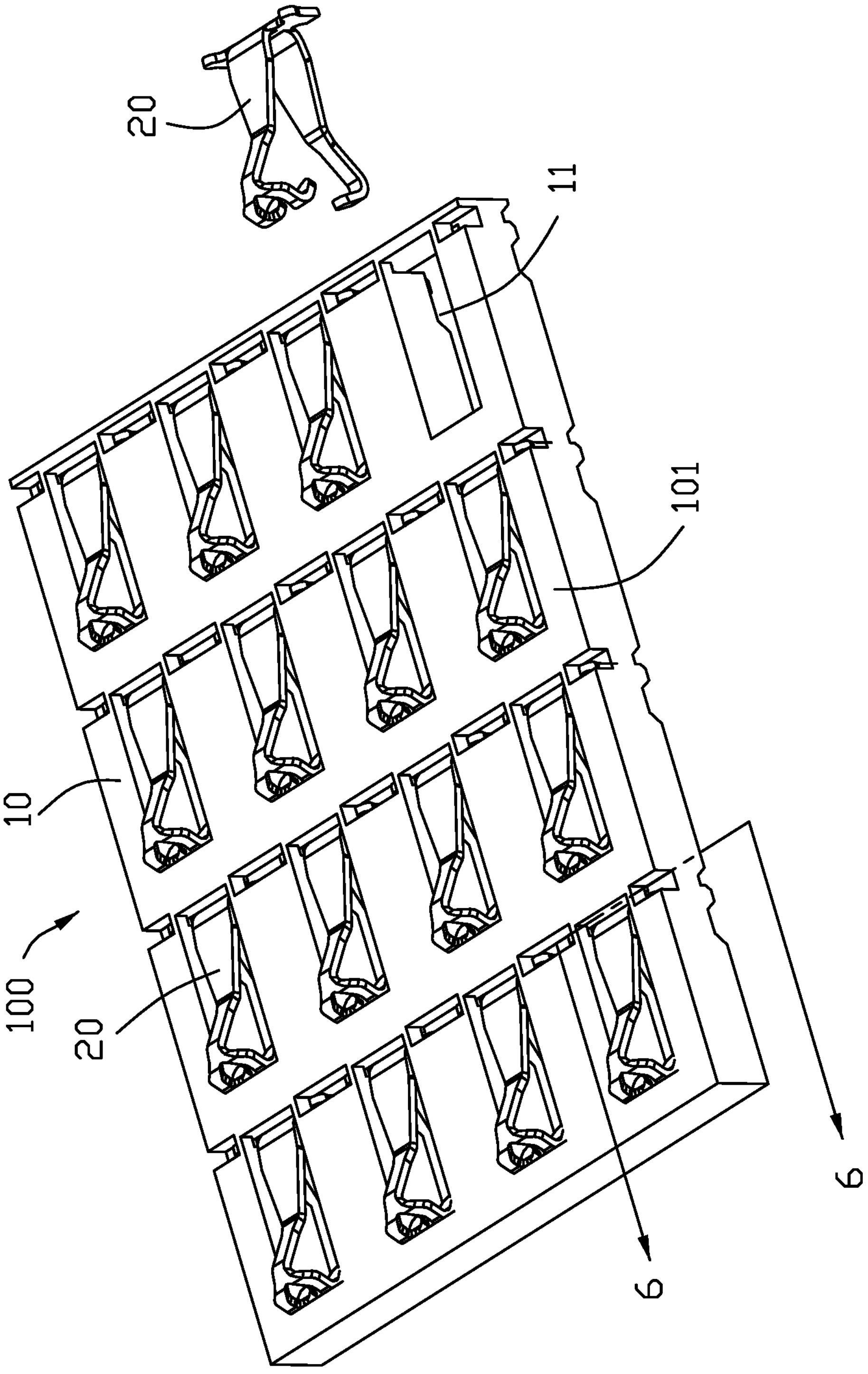
FIG. 1 is a perspective view of a chip connector of an embodiment of this present invention, wherein one conductive terminal is disassembled from an insulative housing.

Referring to FIGS. 1-6, a chip connector 100 for electrically connecting a chip module to a circuit board is illustrated. The chip connector 100 comprises an insulative housing 10 loaded with a plurality of conductive terminals 20 thereon, while the figures only show the partial housing with 4*4 matrix of terminals 20. The housing 10 is molded from insulating material and defines opposite first/upper face 101 and second/lower face 102, and a plurality of terminal passageways 11 and a pair of fixing slots 12 at both sides of each terminal passageways 11, the receiving cavities 11 go through the first face 101 and the second face 102 and are arranged in a matrix.

Figure 2:
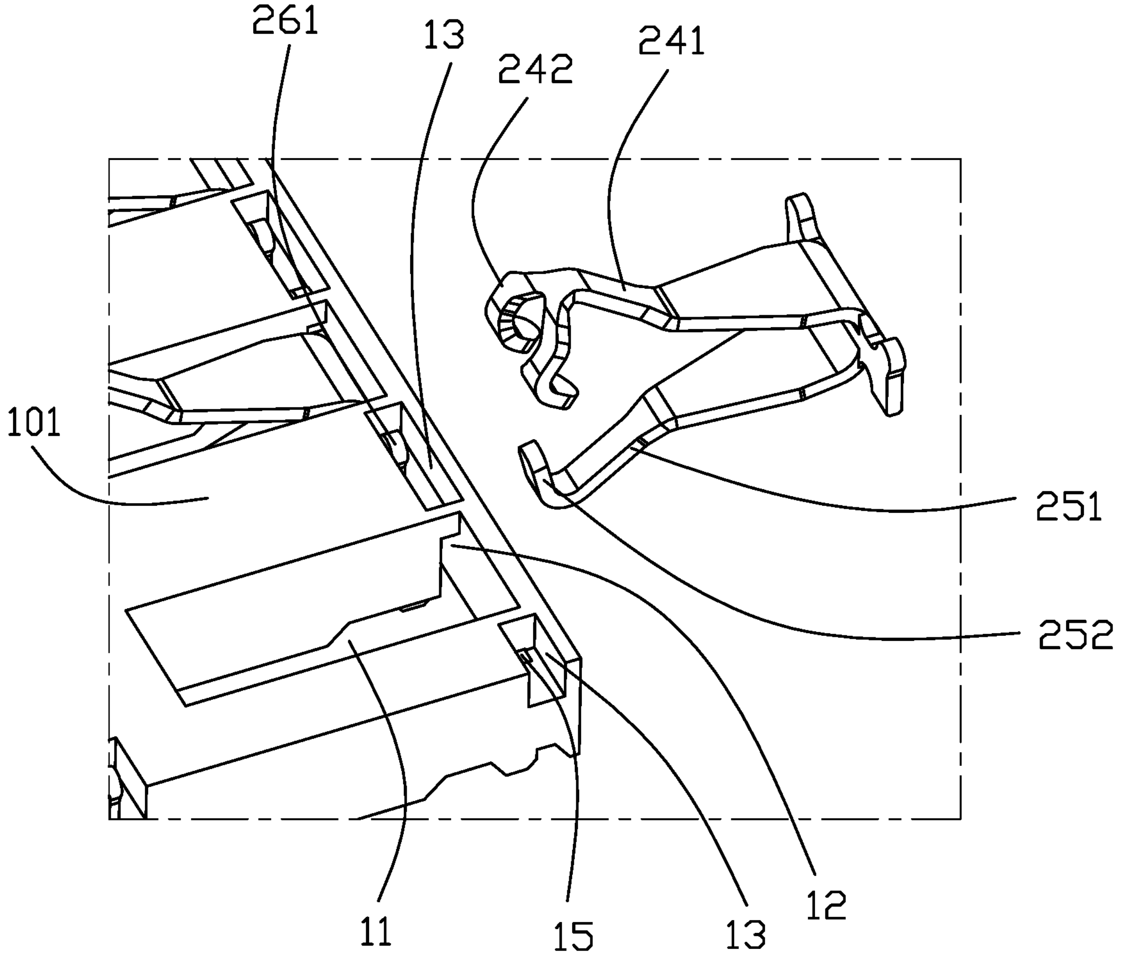
FIG. 2 is an enlarged perspective view of a part of the chip connector in FIG. 1.
Figure 3:
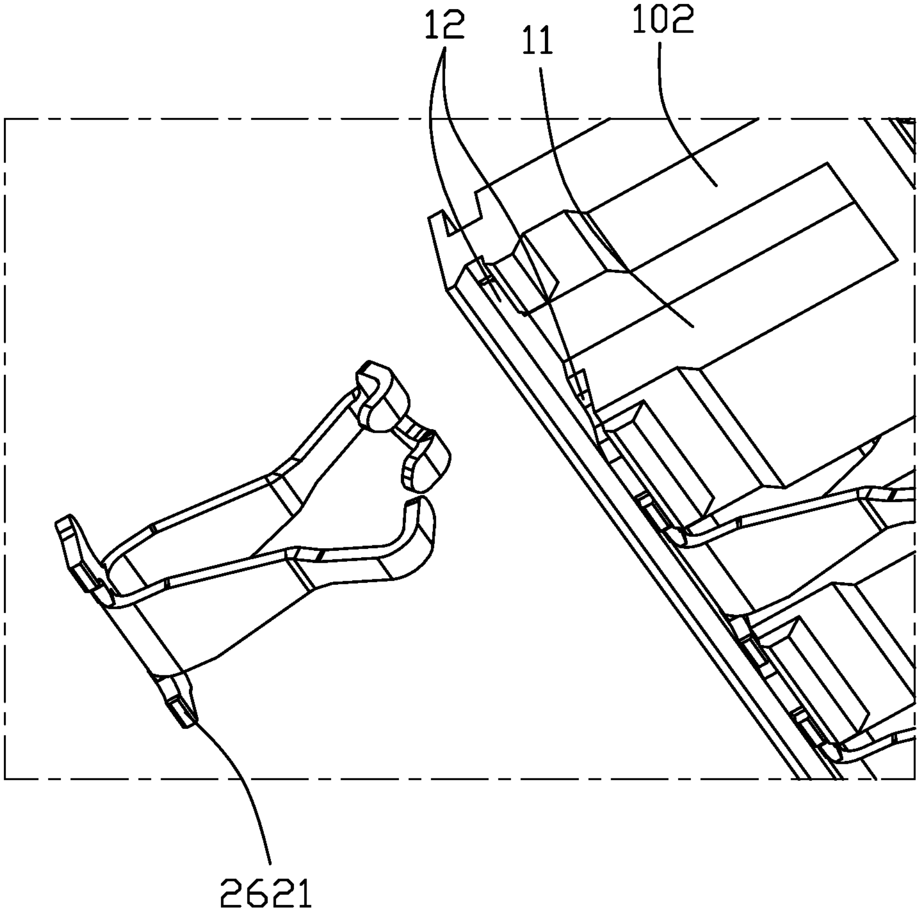
FIG. 3 is another perspective view of the chip connector of FIG. 2.
Figure 4:
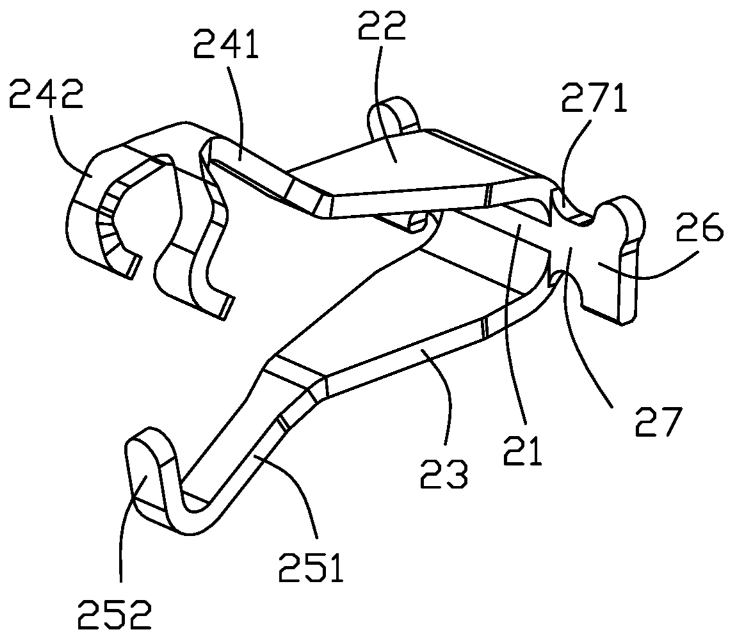
FIG. 4 is a perspective view of the conductive terminal.

As shown in FIGS. 2 and 3, the fixing slot 12 extends upward from the second face 102 toward the first face 101 but not penetrates the first face 101, the housing 10 defines two buckling recesses 13 which extend downward from the first face 101 toward the second face 102 and are overlapped with part of the fixing slot 12 in the left-right direction, the fixing slot 12 and the corresponding buckling recesses 13 are interconnected with each other by an opening 15.

The terminal 20 comprises a main portion 21, and an upper elastic arm 22 extending from the upper edge of the main portion 21 and an upper contacting portion 24 extending from the upper elastic arm 22 upwardly, and a lower elastic arm 23 with a lower contacting portion 25 extending from the main portion 21 downwardly. The terminal 20 further comprises a fixing portion 26 and a transitioning portion 27 which combine the fixing portion 26 and the main portion 21 integrally together, the fixing portion 26 and the transitioning portion 27 and the main portion 21 are in a same vertical plane, i.e., forming a vertical portion.

When the terminals 20 are assembled into the housing 10 from the second face 102, the upper elastic arms 22 and the lower elastic arms 23 go through the terminal passageways 11 until the upper contact portions 24 are located above the first face 101 and the lower contact portions 25 of the lower elastic arms 23 are still under the second face 102, the fixing portions 26 are received in the fixing slots 12, the main portions 21 and the transitioning portions 27 are attached to the inner face of the passageways 11 between the two fixing slots 12. The transitioning portion 27 provides a design space between the main portion 21 and the fixing portion 26, so that there is an allowable error in specific products.

The fixing portion 26 defines a buckling head 261 slantwise protruding upwards and outwards, and a cutting portion 262 which has a strip-cutting surface 2621 protruding downwards for connecting a strip, the buckling heads 261 goes through the openings 15 and are retained in the buckling recesses 13, each transitioning portion 27 has two notches 271 for providing a deformation space for the corresponding the fixing portion 26. The terminals 20 can still be stably retained on the substrate by the fixing portions 26 and the buckling heads 261 though the substrate is thinner for meeting the miniaturization and compactness of the chip connector 100. An outer portion 2611 of the buckling head 261 protrudes outward from the outer side 2601 of the fixing portion 26 with a distance of 0.3 mm.

Figure 5:
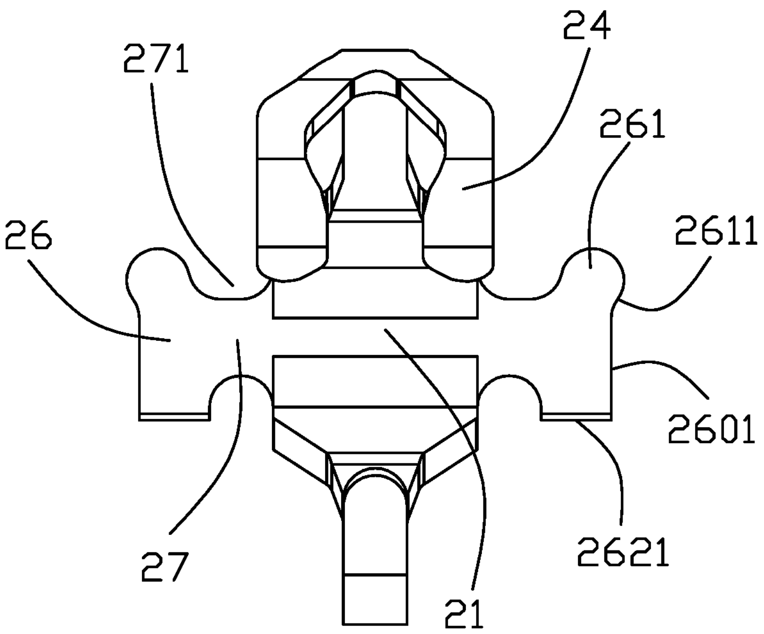
FIG. 5 is a front elevational view of the chip connector in FIG. 4.
Figure 6:
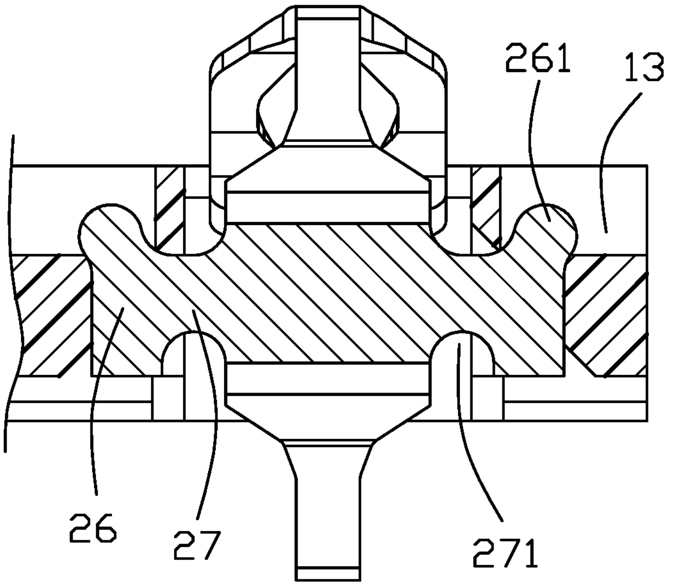
FIG. 6 is a cross-sectional view of the chip connector taken along line 6-6 in FIG. 1.

As shown in FIG. 5, the buckling heads 261 protrude upwards and outwards and the outer portions 2611 protrude outward from the outer sides 2601 of the fixing portions 26. Thus, the buckling heads 261 can be buckled in the buckling recesses 13. The outer sides of the cutting portions 262 are flushed with the outer sides 2601 of the fixing portions. In this embodiment, the height of the main portion 21 in the vertical direction is smaller than the width of the cutting surface 2621 in the left-right direction, so that the height of the entire terminal is relatively small, which meets the requirement of thinning the substrate 10.

The upper contact portion 24 has an upper connecting portion 241 extending upward and forward obliquely from the upper of the elastic arm 22 and a Y-shaped portion 242 extending forward and downward obliquely from the connecting portion 241. The lower contact portion 25 has a lower connecting portion 251 extending obliquely downwards and forwards from the lower elastic arm 25 and an end portion 252 extending obliquely upwards and forwards from the lower connecting portion 251. When the upper and lower contact portions 24, 25 of the chip connector 100 are pressed retracted into the terminal passageways 11, the end portions 252 of the lower contact portions 25 inserts into the Y-shaped portion 242. In the embodiment, when the terminals are assembled into the housing 10 but not pressed, an upper end of the upper elastic arm 22 is substantially flushed or slightly higher than the first face 101 and a lower end of the lower arm is substantially flushed with or slightly lower than the second face 102. The upper contact portions 24 are above the first face 101 and the lower elastic portions 25 are below the second face 102, and the upper ends of the upper contact portions 24 and the lower ends of the lower contact portions 25 are in the terminal passageways 11 for guiding. Viewed in a direction perpendicular the vertical portion, the buckling heads 261 protrude upwards from the upper ends of the upper contact portions 24.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. A chip connector comprising:

an insulative housing defining an upper face and a lower face, a plurality of receiving passageways extending through the upper face and the lower face, a pair of fixing slots at opposite sides of each receiving passageway, and a pair of buckling recesses; and a plurality of conductive terminals received respectively in the receiving passageways, each terminal comprising a main portion extending longitudinally, an upper elastic arm extending from the main portion with an upper contacting portion located above the upper face, and a lower elastic arm extending from the main portion with a lower contacting portion located below the lower face, and two fixing portions at opposite sides of the main portion, the fixing portion having a buckling head;

wherein the buckling head slantwise extends upwards and outwards from an upper edge of the fixing portion and is retained in the buckling recess when the fixing portions are retained in the retaining slots; and wherein each terminal comprises a strip-cutting surface and a width of the main portion in an upper-lower direction is smaller than a width of the strip-cutting surface in a left-right direction perpendicular to the upper-lower direction.

2. The chip connector as claimed in claim 1, wherein the fixing portion and the main portion are integrally joint by a transitioning portion, the main portion and the transitioning portion and the two fixing portions are in a same vertical plane, the transitioning portion defines a notch to provide an elastic deformation space for the main portion and the buckling head.

3. The chip connector as claimed in claim 1, wherein the strip-cutting surface is defined on a lower edge of the fixing portion.

4. The chip connector as claimed in claim 1, wherein an outer side of the fixing portion is located below the buckling head and an outer side of the strip-cutting surface is flushed with the outer side of the fixing portion.

5. The chip connector as claimed in claim 1, wherein the fixing slot extends upward from the lower face and the buckling recess extends downward from the upper face, the fixing slot and the buckling recess are staggered by a certain distance in the left-right direction and in communication with each other, and the buckling head passes through the fixing slot and is locked in the buckling recess.

6. The chip connector as claimed in claim 5, wherein the upper contacting portion comprises an upper connecting portion extending upward and forward obliquely from the upper elastic arm and a Y-shaped portion extending forward and downward obliquely from the upper connecting portion.

7. The chip connector as claimed in claim 6, wherein the lower contacting portion has a lower connecting portion extending obliquely downwards and forwards from the lower elastic arm and an end portion extending obliquely upwards and forwards from the lower connecting portion and being received in the Y-shaped portion.

8. The chip connector as claimed in claim 1, wherein the buckling head protrudes upward beyond an end portion of the upper contacting portion.

9. The chip connector as claimed in claim 1, wherein each of the plurality of conductive terminals has a notch and a lower end of the notch is lower than a lower end of the upper contacting portion.

10. The chip connector as claimed in claim 1, wherein an outer portion of the buckling head protrudes outward from an outer side of the fixing portion with a distance of approximately 0.3 mm.

11. A chip connector comprising:

an insulative housing defining an upper face and a lower face, a plurality of receiving passageways extending through the upper face and the lower face, a pair of fixing slots at opposite sides of each receiving passageway, and a pair of buckling recesses; and a plurality of conductive terminals received respectively in the receiving passageways, each terminal comprising a main portion extending longitudinally, an upper elastic arm extending from the main portion with an upper contacting portion located above the upper face, and a lower elastic arm extending from the main portion with a lower contacting portion located below the lower face, and two fixing portions at opposite sides of the main portion, the fixing portion having a buckling head;

wherein the buckling head slantwise extends upwards and outwards from an upper edge of the fixing portion and is retained in the buckling recess when the fixing portions are retained in the retaining slots; and wherein the buckling head protrudes upward beyond an end portion of the upper contacting portion.

12. A chip connector comprising:

an insulative housing defining an upper face and a lower face, a plurality of receiving passageways extending through the upper face and the lower face, a pair of fixing slots at opposite sides of each receiving passageway, and a pair of buckling recesses; and a plurality of conductive terminals received respectively in the receiving passageways, each terminal comprising a main portion extending longitudinally, an upper elastic arm extending from the main portion with an upper contacting portion located above the upper face, and a lower elastic arm extending from the main portion with a lower contacting portion located below the lower face, and two fixing portions at opposite sides of the main portion, the fixing portion having a buckling head;

wherein the buckling head slantwise extends upwards and outwards from an upper edge of the fixing portion and is retained in the buckling recess when the fixing portions are retained in the retaining slots; and wherein each of the plurality of conductive terminals has a notch and a lower end of the notch is lower than a lower end of the upper contacting portion.

13. A chip connector comprising:

an insulative housing defining an upper face and a lower face, a plurality of receiving passageways extending through the upper face and the lower face, a pair of fixing slots at opposite sides of each receiving passageway, and a pair of buckling recesses; and a plurality of conductive terminals received respectively in the receiving passageways, each terminal comprising a main portion extending longitudinally, an upper elastic arm extending from the main portion with an upper contacting portion located above the upper face, and a lower elastic arm extending from the main portion with a lower contacting portion located below the lower face, and two fixing portions at opposite sides of the main portion, the fixing portion having a buckling head;

wherein the buckling head slantwise extends upwards and outwards from an upper edge of the fixing portion and is retained in the buckling recess when the fixing portions are retained in the retaining slots; and wherein an outer portion of the buckling head protrudes outward from an outer side of the fixing portion with a distance of approximately 0.3 mm.

* * * * *